INVENTOR
NORMAN B. HUMPHREY
ATTORNEY

United States Patent Office 3,539,806
Patented Nov. 10, 1970

3,539,806
DIRECTION DETERMINING GAMMA-RAY DETECTOR
Norman B. Humphrey, Dallas, Tex., assignor to Texas Instruments Incorporated, Dallas, Tex., a corporation of Delaware
Filed Mar. 8, 1966, Ser. No. 532,691
Int. Cl. G01t 1/16, 1/18; H01j 39/00, 39/28
U.S. Cl. 250—71.5      16 Claims

ABSTRACT OF THE DISCLOSURE

Disclosed is a gamma-ray scintillator detector that determines the direction of a source of gamma-rays without movement of the scintillator detector. Also disclosed are means to distinguish a scintillation of a central scintillator from a scintillation of an outside scintillator when both scintillations are recorded by the same detecting means.

This invention relates to scintillator detector and more particularly to a gamma-ray scintillator detector using a plurality of scintillators.

Directionality in the detection and identification of gamma-ray emitting isotopes has been generally achieved by one of two methods. The first method is that of placing a heavy metal shielding on all except one side of a scintillator. The exposed side must then be turned toward the gamma-ray source for maximum reading. The second method is that of anti-coincidence; instead of heavy metal shielding, a second scintillator surrounds all but one side of the main detecting crystal. If radiation occurs in both scintillators simultaneously, the radiation is not recorded. Only radiation detected in the surrounded scintillator is recorded. This method is normally used for shielding out background radiation so that the resulting gamma-ray spectrometer is enhanced in its detecting accuracy. It may also be used for directionality since the maximum reading will occur when the exposed face of the center scintillator is turned toward the radiation source. If either of these methods is used to obtain a spectrum of an unknown source and to determine the direction of that source, it is necessary to have the assembly pivoted so that the directionality is achieved by orientation of the unshielded side of the main detector toward the emitting source.

It is therefore one object of this invention to provide a directional gamma-ray spectrometer.

It is another object of this invention to provide a directional spectrometer that does not have to be rotated to determine the origin of the source of radiation.

It is still another object of this invention to provide a spectrometer that can accumulate a gamma-ray spectrum and simultaneously indicate the gamma-ray source direction with the scintillometer assembly remaining stationary.

One feature of the invention is a gamma-ray spectrometer having a principal scintillator surrounded by a plurality of scintillators which are used to determine the direction of the source of the radiation.

Other objects and features of the invention will become more readily understood from the following detailed description and appended claims when read in conjunction with the accompanying drawings in which like reference numerals designate like parts throughout the figures thereof and in which:

Figure 1:
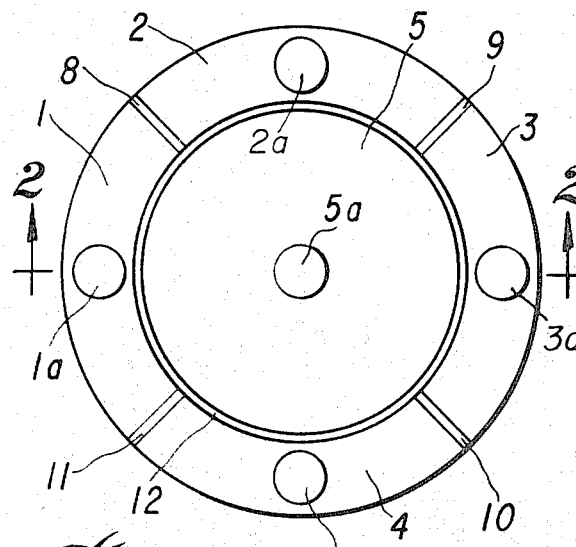
FIG. 1 is a top plan view of the scintillator detector of the present invention.

This invention extends the idea of coincidence or anti-coincidence so that a crystal detector can accumulate a gamma-ray spectra and simultaneously indicate gamma source direction with the scintillator detector assembly remaining stationary. This is accomplished by having a central scintillator surrounded by a plurality of scintillators. Each scintillator has associated therewith a photomultiplier which detects light pulses within the scintillators due to gamma-radiation. There are three main processes, all continuous functions of photon energy by which photons may interact with matter giving up all or part of their energy. These are: (1) a photo-electric effect, (2) Compton scattering by electrons in the atoms of the material, and (3) production of a positron-electron pair in the electric field of an atom. Each of these three processes is briefly described below:

In the photo-electric process, all of the energy of the incident photon is absorbed by a bound electron of an atom, appearing as kinetic energy of the electron as the electron is ejected from the atom. The energy of the ejected electron will then be equal to the difference between the energy of the incidence photon and the binding energy of the K shell from which the electron was ejected. Although some energy is absorbed by recoil of the nucleus of the atom, this is negligible compared with the energy of the gamma-ray and the photoelectron. If the energy of the incidence gamma-ray photon exceeds the binding energy of the K shell, interaction will be principally with the electrons in that shell of the atom. As a result of the process, the atom is left with a vacancy in the shell from which the electron was ejected, resulting in the emission of X-rays. This series of events occurs within a short time relative to other time dependent processes in a scintillator detector. The result is that the X-rays from the initial photoelectric event are generally absorbed by a second photoelectric event and the total energy of the incidence photon is absorbed within the detector.

In the Compton process, incident photons are scattered by the electrons with a partial energy loss. In this process scattering generally occurs with electrons that are considered essentiallly free and the energy of the incoming photon is shared between the electron and a scattered quantum. At low energies the gamma-ray may be scattered from a bound electron with the atom remaining in its initial state. In this case there is negligible energy loss and only a change in direction. The energy of the scattered photon then extends from the original photon energy down to a minimum value which is always less than mc.²/2 (0.257 mev.-million electron volts).

If the incidence photon has energy in excess of the rest mass of the positron-electron pair (1.02 mev.), then pair production is possible. In this process (the third process indicated above), which occurs in the presence of the Coulomb field of a nucleus, the gamma-ray disappears and a positron-electron pair is created. The total energy of the pair of particles will be equal to the energy of the primary photon and the kinetic energy of the pair will be equal to the total energy minus the rest energy of the two particles ($2mc^2$). Since the positron is unstable as it comes to rest in the field of an electron, annihilation of the two particles occurs with the emission of two photons equal in energy to the rest mass of the particle (0.511 mev.). Interaction by the pair process in a detector will therefore result in an energy loss equal to the primary photon energy minus 1.02 mev. There is a possibility also of detecting one or both of the annihilation quantum by either a photo-electric or Compton process.

Figure 2:
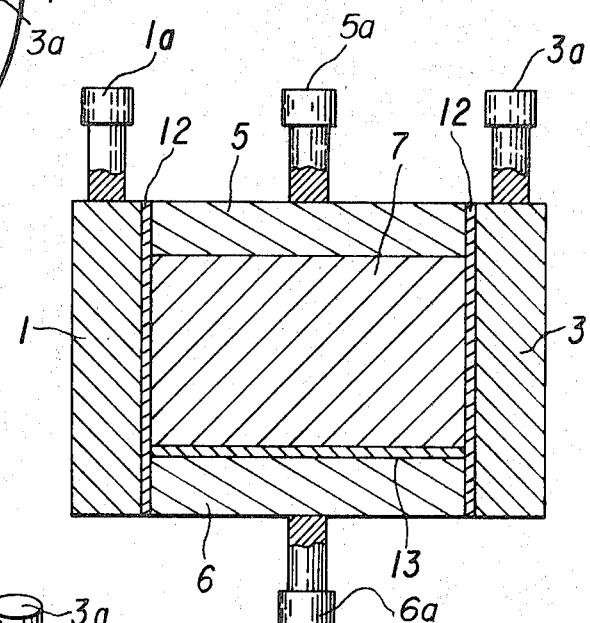
FIG. 2 is a cross-sectional view of the scintillator detector taken through section line 2—2 of FIG. 1.
Figure 3:
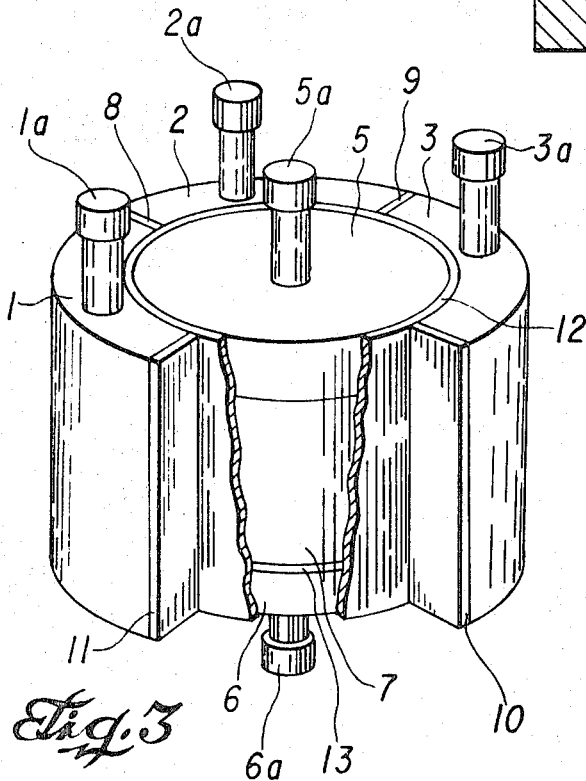
FIG. 3 is a pictorial representation of the scintillator detector with a section removed to show the construction thereof.

Referring now to the drawings, there is shown in FIGS. 1, 2, and 3 a composite spectrometer made up of seven different scintillators. There is a central scintillator 7 which is enclosed around its periphery by scintillators 1, 2, 3, and 4. Enclosing the top portion of scintillator 7 is another scintillator 5 and enclosing the bottom portion of scintillator 7 is scintillator 6. All surface interfaces between the adjacent scintillators are covered with a light reflecting substance such as for example, magnesium oxide powder. There is one exception. There is no light reflecting substance between scintillators 5 and 7. Each of the scintillators 1–6 have a direction sense, that is each of the scintillators will receive maximum radiation when the source of radiation is on the same side of the scintillator detector as the particular scintillator is located. By placing the scintillometer in a fixed orientation, each scintillator will always have the same side in a particular direction. For purposes of illustration, the orientation of the scintillometer in FIGS. 1–3, will be as follows: Scintillator 1, left, scintillator 3, right, scintillator 2, forward, scintillator 4, back, scintillator 5, up and scintillator 6, down.

Around the periphery of scintillators 5, 6 and 7, the reflecting material 12 is in the form of a cylinder and encloses the sides of the three scintillators. Separating scintillator 6 from scintillator 7 is reflector 13 having the same diameter as scintillators 6 and 7. Scintillators 1 and 2 are separated by partition 8, partition 9 is between scintillators 2 and 3, partition 10 is between scintillators 3 and 4, and partition 11 is between scintillators 4 and 1. These light reflecting partitions keep light from a photon in one scintillator from reflecting in an adjacent scintillator. However, they do not stop the penetration of gamma-rays.

A photomultiplier tube is mounted upon each of the scintillators enclosing scintillator 7. Scintillators 1–6 have mounted thereon photomultipliers 1a thru 6a respectively. Each of the photomultiplier tubes detects the light pulses generated in the scintillators due to gamma-ray energy loss, and will produce a voltage pulse at the output of the photomultiplier tube. Scintillator 7 does not have a photomultiplier tube mounted directly thereon since it is completely enclosed by the other scintillators. However, since there is no light reflecting partition between photomultipliers 5 and 7, scintillator 5a will detect light pulses within scintillator 7 as well as within scintillator 5.

Scintillator 7 may be made from a material different from the material of other scintillators 1–6. Scintillator 7 may be made, for example, from an inorganic material. The inorganic materials that are most widely used at the present time are the alkali-halides, in particular, the alkali iodides. To obtain maximum density, optical transparency, and uniform activation, it is necessary to prepare the scintillator in the form of a single crystal. Single crystals may be made from such materials as lithium iodide (LiI), sodium iodide (NaI), potassium iodide (KI), rubidium iodide (RbI), and cesium iodide (CsI). Activation of the alkali-halide crystals is usually carried out by mixing the activation impurity, in a form of a salt, with the starting material prior to the growth of the crystal. One activator frequently used is thallium and is added to the alkali iodides in the form of thallium iodide (TlI).

Scintillators 1–6 surrounding the scintillator 7 may be made for example from an organic material dissolved in a plastic. The organic materials that are found to be efficient scintillators generally fall into the class of aromatic hydrocarbons, both pure and substituted. The presence of slight traces of impurities in inorganic scintillators can result in a substantial quenching of the light output. For this reason, it is necessary to purify the starting material carefully before making the scintillator. In contrast to the alkali-halides, no activator is added to the organic material. Plastic scintillators usually consist of an organic scintillator dissolved in either polystyrene or polyvinyl- toluene. The optimum concentration of the solute is of the order of a few percent or less. Plastic scintillators are available commercially and can be obtained in the form of discs, cylinders, thin films, or long rods. One of the chief advantages of plastic scintillators in the wide variety of shapes and sizes in which they can be obtained.

Referring to FIG. 3, one or more photomultiplier tubes 1a–6a are placed on the scintillator section 1–6 respectively and the entire assembly is coated with a light reflecting substance and cased (not shown) to exclude external light. A light pulse generated in any of the plastic scintillators 1–6 by gamma-ray loss will produce a voltage impulse in the respective photomultiplier tube mounted thereon. For example, a gamma-ray entering scintillator 1 losing partial energy and then entering scintillator 7 will produce voltage pulses in photomultiplier tubes 1a and 5a. The light pulse in scintillator 7 being detected by photomultiplier 5a since there is no reflective coating between scintillators 5 and 7. Gamma-ray energy entering scintilator 5, losing partial energy, and entering scintillator 7 will produce voltage pulses in photomultiplier 5a only.

If the predominant radiation intensity is from the side on which scintillator 1 is located, there will be a higher counting rate in scintillator 1 and scintillator 7 than in any of the other scintillators. Scintillator 7 is large and dense and most gamma-rays entering scintillator 7 through scintillator 1 will be absorbed, therefore only scintillators 1 and 7 will show a high counting rate. In practice gamma-radiation entering the detector may lose energy as follows: (1) in one or more plastic scintillators only; (2) in a plastic scintillator and scintillator 7; (3) in scintillator 7 only; and (4) in scintillator 7 and two or more plastic scintillators. In the case of example (3) above in which energy loss is in scintillator 7 only, this would occur only if radiation entered through one of the surrounding scintillators without energy loss.

Scintillator 5 acts not only as an anti-coincidence shield but as a light pipe for scintillator 7 since photomultiplier 5a gathers light pulses from both scintillators 5 and 7. It is necessary that the pulses be separated. This is done by using the phenomena that voltage pulses out of photomultiplier 5a will have a much faster rise time when the light pulses originate from scintillator 5 than when they originate from scintillator 7. Thus the pulses can be separated with high and low pass filters.

Figure 4:
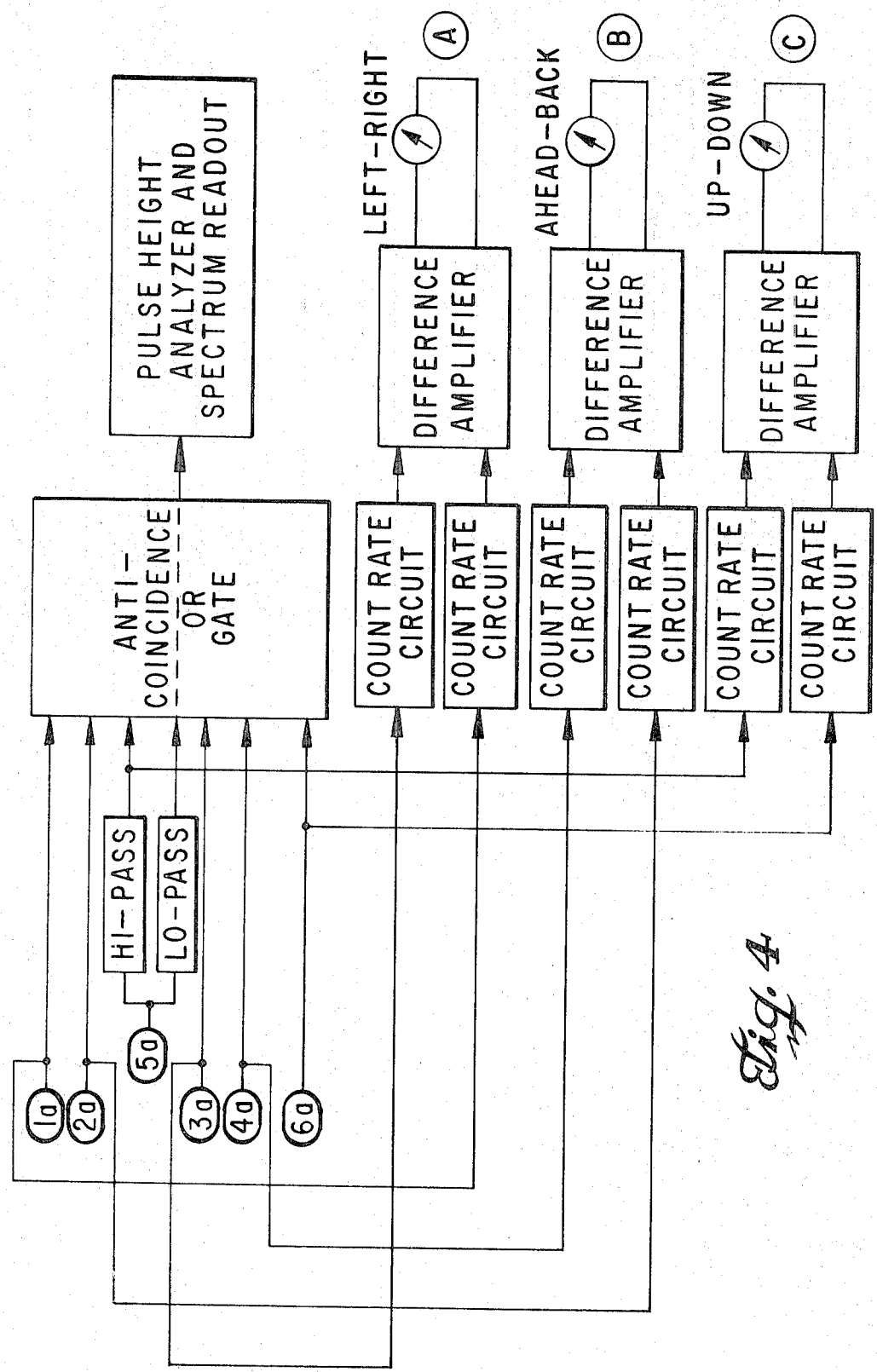
FIG. 4 is a block diagram of the associated circuitry use with the scintillator detector to indicate direction of radiation and the spectrum of the radiation source.

Referring now to FIG. 4, there is shown a block diagram of the scintillometer and the associated circuit which make up the spectrometer. The photomultiplier tubes are represented by the numbers 1a, 2a, 3a, 4a, 5a, and 6a within circles. Each of the photomultipliers' output goes to an anti-coincidence or-gate. This is simply an or-gate in which a signal from the low pass filter will pass through only if it is the only input applied thereto. If there is an output from any of the other photomultiplier tubes applied to the or-gate at the same time as an output from scintillator 7 (from the low pass filter) is applied, no output will be produced from the or-gate. The high pass and low pass filters are used at the output photomutliplier 5a as shown and explained above. The separation of the pulses in scintillators 5 and 7 is accomplished by passing the signal from photomultiplier 5a through the filters.

Also connected to the output of the photomultiplier tubes are the count rate circuits. These circuits are one shot multivibrators which accept the output of photomultipliers and have a switching range to accept various count rates. The outputs of the count rate circuits are applied to a difference amplifier. Connected to the difference amplifier is a galvanometer which will deflect indicating the direction of the radiation. For example, looking at FIG. 1 again it will be seen that scintillator 1 and scintillator 3 are diametrically opposite. If directions are assigned as left for scintillator 1 and right for scintillator 3, then the side having the greatest radiation impinging thereon will have the greater output and the greater count rate. Therefore, when the outputs ffrom scintiallator 1 and scintillator 3 are fed to their respective count rate circuits and the difference taken between the two in the difference amplifier, the galvanometer will deflect either right or left indicating which scintillator is receiving the most radiation. In like manner scintillator 2 and scintillator 4 are diametrically opposite and indicate whether the greatest count rate is from scintillator 2 which indicates a forward direction or scintillator 4 which indicates the back direction. Scintillator 5 will indicate if the radiation is coming from above and scintillator 6 will indicate radiation from below.

The output from the anti-coincidence gate is directed to a pulse height analyzer and a spectrum readout. A commercially available analyzer may be used, for example, Technical Measurements Corporation, Model 404C, spectrum and pulse height analyzer. This particular device has facilities for both oscilloscope readout or a printout to indicate the gamma spectrum being analyzed.

Figure 5:
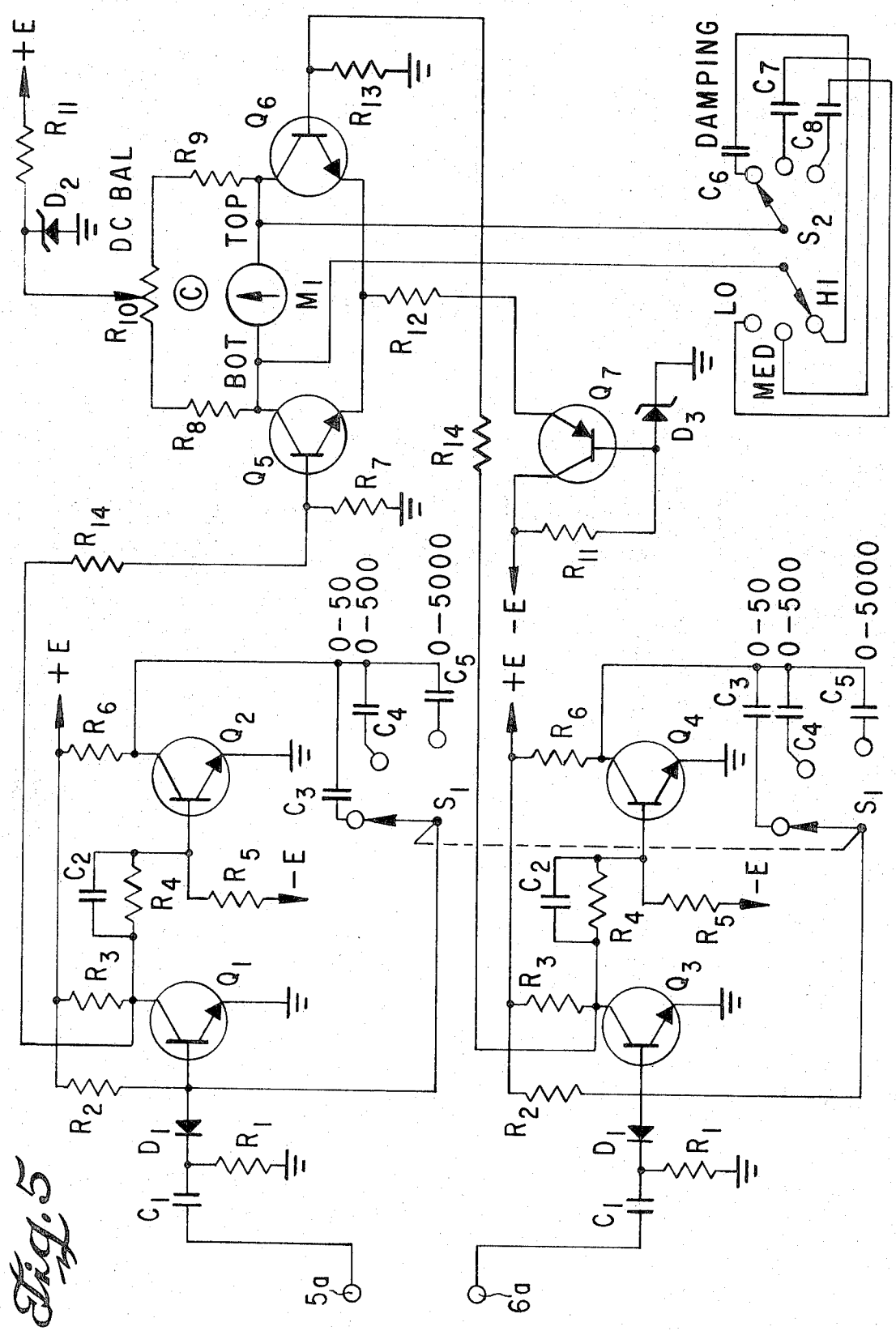
FIG. 5 is a schematic diagram, a pair of count rate circuits, a differential amplifier and a direction indicator.

The count rate circuit and difference amplifier are shown in more detail in FIG. 5. There are two identical circuits shown, the circuit including transistors $Q_1$ and $Q_2$ and the circuit including $Q_3$ and $Q_4$. Each of these circuits makes up one of the count rate circuits. For example, the output of the photomultiplier tube $5a$ is differentiated by the differentiator circuit $R_1$ and $C_1$ and is coupled through diode $D_1$ to the base of transistor $Q_1$. Transistors $Q_1$ and $Q_2$ and their associated circuitry comprise a one shot multivibrator. The negative spike from the differentiator turns transistor $Q_1$ off since it is normally conducting. A positive pulse from the collector of transistor $Q_1$ turns transistor $Q_2$ on. The length of time that transistor $Q_2$ remains on is determined by the capacitor $C_3$, $C_4$ or $C_5$ selected by switch $S_1$. When transistor $Q_2$ turns off, transistor $Q_1$ will again turn on and will be ready for the next pulse. In the circuit, transistor $Q_1$ is biased by resistors $R_2$ and $R_3$ and the pulse generated at the collector of transistor $Q_1$ is coupled to transistor $Q_2$ through capacitor $C_2$ and resistor $R_4$. Transistor $Q_2$ is biased by resistors $R_5$ and $R_6$. The output from the multivibrator is taken from the collector of transistor $Q_1$ and coupled through resistor $R_{14}$ to the base of transistor $Q_5$ which is a part of the difference amplifier. The purpose of switch $S_1$ and the three capacitors $C_3$, $C_4$ and $C_5$ is to change the rate of switching of the one shot multivibrator since there is a need to compensate for the various pulse rates coming from the photomultiplier tube.

The circuit used as the count rate circuit for photomultiplier $6a$ is identical to the one for photomultiplier $5a$. The output of transistor $Q_3$ is coupled to the side of the difference amplifier opposite from the side connected to the output of transistor $Q_1$. The difference amplifier compares the output of the two transistors $Q_1$ and $Q_3$, which is indicative of the amount of radiation impinging on scintillators 5 and 6, and the difference is indicated on the meter $M_1$ in the difference amplifier circuit.

The difference amplifier is made up of transistors $Q_5$ and $Q_6$, $Q_5$ having a bias resistor $R_7$ and a collector resistor $R_8$. Similarly transistor $Q_6$ has bias resistors $R_{13}$ and collector resistors $R_9$. Resistors $R_8$ and $R_9$ are each connected to one end of resistor $R_{10}$ which is an adjustable resistor and is used to balance the voltage applied between transistors $Q_5$ and $Q_6$. The collector voltage of the transistors $Q_5$ and $Q_6$ is applied through a resistor $R_{11}$ and is stabilized by Zener diode $D_2$. Transistors $Q_5$ and $Q_6$ have a common emitter resistor $R_{12}$ and a current source comprised of transistor $Q_7$, resistor $R_{14}$, and diode $D_3$. Diode $D_3$ is a Zener diode which maintains a fixed potential on the base of the transistor $Q_7$. In this manner the difference amplifier is supplied a constant current which stabilizes the amplifier. Connected between the collectors of $Q_5$ and $Q_6$ is a galvanometer which has a center zero position for the indicator needle. Whenever the difference between the outputs of photomultipliers $5a$ and $6a$ is zero, the needle will be in the center position showing no difference. However, when the count rate of one of the photomultipliers increases, the output of the connected count rate circuit will be greater causing a deflection of the needle indicating which photomultiplier is receiving the most radiation, thereby indicating the direction of the source of radiation. A switch and three capacitors are connected across the meter and are used for damping the meter to prevent vibration of the needle due to the various count rates. Only two count rate circuits and one difference amplifier have been shown in FIG. 3, however the scintillometer detector as shown in FIG. 4 will have six count rate circuits and three difference amplifiers.

The scintillator detector shown in FIGS. 1, 2, and 3 and described herein has only four scintillators surrounding the central scintillator. However, the number could be increased to more accurately determine the direction or the radiation source. Similarly, more than one photomultiplier tube could be applied to each scintiallator to increase the sensitivity of the spectrometer.

Although the present invention has been shown and illustrated in terms of a specific preferred embodiment, it will be apparent that changes and modifications are possible without departing from the spirit and scope of the invention as defined in the appended claims.

What is claimed is:

1. A gamma-ray scintillator detector comprising in combination:
    (a) a central scintillator;
    (b) a plurality of scintillators enclosing said central scintillator;
    (c) a plurality of light reflecting partitions separating all except one of said plurality of scintillators from each other and all but one from said central scintillator;
    (d) a plurality of photomultiplier tubes mounted on said scintillators to detect radiation impinging on said scintillators,
        whereby one of said plurality of photomultiplier tubes detects scintillations in both said one of said plurality of scintillators and in said central scintillator; and
    (e) means for determining which of said scintillations detected by said one of said plurality of photomultiplier tubes occurred in said one of said plurality of scintillators and which in said central scintillator.

2. The gamma-ray scintillator detector according to claim 1, wherein said light reflecting partitions are of magnesium oxide powder.

3. A gamma-ray scintillator detector according to claim 1 including means for analyzing the pulse height spectrum of the output of said photomultiplier tubes.

4. A gamma-ray scintillator detector according to claim 1 further including means to determine direction of the source of said radiation without movement of said scintillometer.

5. A gamma-ray scintillometer detector comprising in combination:
    (a) a central scintillator;
    (b) a plurality of scintillators placed around the periphery, on top of, and under said central scintillator;
    (c) a plurality of light reflecting partitions separating all but one of said plurality of scintillators from each other and from said central scintillator; and
    (d) a plurality of photomultiplier tubes, there being at least one photomultiplier tube on each of said plurality of scintillators, the photomultiplier tube being mounted on said one of said plurality of scintillators to produce an output in response to gamma-ray activations within both the scintillator upon which it is mounted and said central scintillator, and each of the other said photomultiplier tubes being mounted to produce an output in response to gamma-ray excitations within the scintillator upon which it is mounted.

6. The gamma-ray scintillator detector according to claim 5 wherein said plurality of scintillators are plastic scintillators.

7. The gamma-ray scintillator detector acording to claim 5 wherein said central scintillator is surrounded by four scintillators each of which is adjacent about ¼ of the periphery of said central scintillator and said central scintillator is enclosed on the top and bottom sides by two additional scintillators.

8. The gamma-ray scintillometer according to claim 5 wherein said central scintillator comprises an inorganic material and said plurality of scintillators comprises plastic and organic material.

9. A gamma-ray scintillator detector according to claim 5 including means for determining which of said gamma-ray excitations occurred in said one of said plurality of scintillators and which in said central scintillator.

10. A gamma-ray scintillator detector according to claim 5 including means to determine the direction of the source of said gamma-rays without movement of the scintillator detector.

11. A gamma-ray scintillator detector according to claim 5 including means for analyzing the pulse height spectrum of the output of said photomultiplier tubes.

12. A gamma-ray scintillator detector according to claim 5 wherein means are provided for distinguishing scintillations of one of said purality of scintillators from scintillations of said central scintillator including means for analyzing the difference in pulse rise times of the detected scintillations, the difference in rise time being caused by the difference in scintillator material.

13. A gamma-ray scintillator detector according to claim 5 including logic means to determine the direction of said source of radiation without movement of the scintillator detector.

14. A gamma-ray scintillator detector comprising:
 (a) a composite scintillator having a plurality of outputs, each of said outputs indicative of gamma-ray radiation from a different direction;
 (b) means for gating output signals from said plurality of outputs, said means passing a signal when there is a signal from more than one of said plurality of said outputs;
 (c) analyzer means for analyzing the pulse height spectrum of said signals passed through said gating means;
 (d) means for compensating the signal rate from each of said plurality of outputs in accordance with the amount of radiation causing said outputs;
 (e) means for comparing signal rates from selected pairs of said compensating means; and
 (f) means connected to said comparing means and responsive to its output for indicating the direction of gamma-ray radiation without movement of the scintillator detector.

15. The scintillator detector as defined in claim 14 wherein said plurality of outputs are derived from photomultiplier tubes mounted on a plurality of scintillators, said outputs being indicative of photons within said scintillators resulting from gamma-radiation impinging on and entering said scintillators.

16. A gamma-ray scintillator detector for determining the direction of a source of radiation and the spectrum thereof comprising in combination:
 (a) a composite scintillator detector comprising a central scintillator enclosed by a plurality of scintillators, each of said plurality of scintillators having a direction sense related thereto,
 (b) a plurality of photomultiplier tubes, there being at least one photomultiplier tube mounted on each of said scintillators enclosing said central scintillator, the output signal from each of said photomultiplier tubes being proportional to the amount of radiation traversing the scintillator upon which the photomultiplier tube is mounted, and at least one of said photomultiplier tubes detecting radiation entering said central scintillator along with radiation entering one of the other scintillators;
 (c) high pass and low pass filter circuits for separating the output of said at least one photomultiplier tube to detect radiation entering said central scintillator and to separate the output due to radiation in said central scintillator from the output due to radiation in said one other scintillator;
 (d) gating means for detecting output signals from said photomultiplier tubes and passing the output resulting from radiation entering said central scintillator when there are no outputs from any of the other photomultiplier tubes as a result of radiation passing through said plurality of scintillators;
 (e) means for analyzing the pulse height spectrum of the output from said gating means;
 (f) means for comparing the count rate from each photomultiplier tube, there being one comparison circuit for each two photomultiplier tubes, the related direction of each tube being opposite to the other; and
 (g) means connected and responsive to said comparison means for indicating the direction of said source of radiation.

References Cited
UNITED STATES PATENTS

| | | | |
|---|---|---|---|
| 2,830,187 | 4/1958 | Scherbatskoy | 250—71.5 |
| 2,990,474 | 6/1961 | Scherbatskoy | 250—83.3 |
| 2,992,331 | 7/1961 | Bonner et al. | 250—71.5 |
| 3,041,454 | 6/1962 | Jones et al. | 250—71.5 |
| 3,234,382 | 2/1966 | Scherbatskoy | 250—71.5 |
| 3,363,100 | 1/1968 | Cohen et al. | 250—71.5 |
| 2,910,592 | 10/1959 | Armistead | 250—71.5 |

RALPH G. NILSON, Primary Examiner

M. J. FROME, Assistant Examiner

U.S. Cl. X.R.

250—83.3, 83.6, 105, 106, 108